United States Patent [19]

Hadari

[11] 4,293,840

[45] Oct. 6, 1981

[54] EXCESSIVE DESCENT-RATE WARNING SYSTEM PARTICULARLY USEFUL FOR HELICOPTERS

[75] Inventor: Gideon Hadari, Ramat Hasharon, Israel

[73] Assignees: Israel Aircraft Industries Ltd.; Ben Gurion Industries Ltd., both of Israel

[21] Appl. No.: 74,524

[22] Filed: Sep. 11, 1979

[30] Foreign Application Priority Data

May 25, 1978 [IL] Israel .................................... 57402
Sep. 20, 1978 [IL] Israel .................................... 55605

[51] Int. Cl.$^3$ .................. G08B 21/00; G01C 5/00
[52] U.S. Cl. .................. 340/27 AT; 73/178 H; 244/17.13; 340/27 SS; 364/433
[58] Field of Search .......... 340/27 R, 27 AT, 27 NA, 340/27 SS; 73/178 R, 178 T, 178 H; 244/180, 181, 183, 17.13; 364/433, 430; 343/112 A, 112 S, 112 CA

[56] References Cited

U.S. PATENT DOCUMENTS

| 3,936,796 | 2/1976 | Bateman ........................ 340/27 AT |
| 3,947,810 | 3/1976 | Bateman et al. ............... 340/27 AT |
| 3,979,717 | 9/1976 | Barnum et al. ................. 340/27 R |
| 4,115,755 | 9/1978 | Cotton ............................ 340/27 R |
| 4,189,777 | 2/1980 | Kuntman ..................... 340/27 AT |

FOREIGN PATENT DOCUMENTS

2534969 4/1976 Fed. Rep. of Germany ........ 340/27 AT

*Primary Examiner*—James J. Groody
*Attorney, Agent, or Firm*—Benjamin J. Barish

[57] ABSTRACT

In an excessive descent-rate warning systems particularly useful for helicopters, a descent-rate signal is produced corresponding to the rate of change of altitude, and is used for producing a warning signal whenever the descent-rate exceeds the maximum one for the respective altitude according to a predetermined relationship which relationship includes an offset value defining the maximum descent rate at "0" altitude. An increase in the forward-speed of the aircraft is used to reduce the offset in the above predetermined relationship, and thereby to decrease the maximum descent rate at "0" altitude producing the warning signal. A described system may be operated according to a "Take-Off Mode" effective upon take-off to cause a warning signal to be produced upon any descent of the aircraft until it reaches a preselected altitude, at which time the system is automatically actuated to operate according to the above-described Flight Mode.

11 Claims, 9 Drawing Figures

EXCESSIVE DESCENT-RATE WARNING SYSTEM PARTICULARLY USEFUL FOR HELICOPTERS

BACKGROUND OF THE INVENTION

The present invention relates to an excessive descent-rate warning system particularly useful for helicopters.

At the present time, helicopters are usually not equipped with a warning system which automatically warns the pilot in the event the rate of descent of the helicopter is excessive. Accordingly, the helicopter pilot, or co-pilot, is usually required to continuously monitor the instruments and to continuously make mental judgements as to whether the rate of descent is excessive for any particular situation. This not only increases the workload on the pilot, but also increases the possibility of an accident because of insufficient alertness or mistake in judgement.

A number of excessive descent-rate warning systems have been developed for use in conventional fixed-wing aircraft. Examples of such systems are described in U.S. Pat. Nos. 4,060,793, 3,958,218, 3,946,358 and 3,715,718. Such systems, however, being designed for fixed-wing aircraft which land at a relatively high forward speed when compared to helicopters, are generally not applicable to, or used in, helicopters. A number of warning systems for helicopters have been proposed (e.g. U.S. Pat. No. 3,979,717), but these are usually attitude responsive, to warn of a possible tail contact upon landing.

BRIEF SUMMARY OF THE INVENTION

An object of the present invention is to provide an excessive descent-rate warning system particularly useful for helicopter aircraft.

According to a broad aspect of the present invention, there is provided an excessive descent-rate warning system particularly useful for helicopter aircraft, characterized in that it includes means for measuring helicopter altitude and for producing an altitude signal corresponding thereto; means for differentiating the altitude signal and for producing a descent-rate signal corresponding to the rate of change of the altitude signal; comparator means for comparing said altitude and descent-rate signals and for producing a warning signal whenever the descent-rate exceeds the maximum one for the respective altitude according to a predetermined relationship, which relationship includes an offset value defining the maximum descent rate at "0", altitude; means for measuring the forward speed of the aircraft and for producing a forward-speed signal corresponding thereto; and forward-speed controlled means for causing an increase in said forward-speed signal to reduce said offset and thereby to decrease the maximum descent-rate at "0" altitude which produces said warning signal. The forward-speed control means includes a sensitivity selector presettable by the pilot to permit him to preset the rate at which the latter means will reduce the offset.

In the preferred embodiment of the invention described below, the predetermined relationship is a substantially linear one represented by a substantially straight line in a graphic illustration of such relationship, and includes an offset value defining the maximum descent-rate at "0" altitude, said forward-speed controlled means shifting said substantially straight line in a direction to reduce said offset at increased forward speeds.

The system including the foregoing features is to be distinguished from the warning system described in the abovecited U.S. Pat. No. 3,958,218 which system is directed particularly to a conventional fixed-wing aircraft to warn the pilot of the danger of impacting a mountain or the like; in that system, the forward-speed signal increases the allowed amplitude permitted by a rate limiter to increase the warning time upon increasing aircraft speeds. In the present case, however, the warning system is designed particularly for use with helicopters, which involve a substantially lower forward speed upon landing than the conventional fixed-wing aircraft, and acts, in response to the measured forward speed, to reduce the offset value which defines the maximum descent-rate at "0" altitude (i.e., at touchdown) permitted before the warning system is actuated.

According to a modification described herein, the system further includes control means effective upon take-off to cause a warning signal to be produced upon any descent of the aircraft until it reaches a preselected altitude. More particularly, the latter control means comprises a mode selector switch automatically actuable to either a Flight Mode or to a Take-off Mode, comparator means comparing the measured aircraft altitude with said preselected altitude, said comparing means maintaining the mode selector switch in the Take-off Mode while the measured altitude is less than the preselected altitude, and automatically actuating the mode selector switch to the Flight Mode when the measured altitude reaches the preselected altitude; and a control circuit controlled by said mode selector switch to cause a warning signal to be produced upon any descent of the aircraft when the mode selector switch is in the Take-off Mode.

According to a second modification described herein the system further includes suppressing means for suppressing the warning signal for a period of time which increases with an increase in the altitude signal corresponding to the measured aircraft altitude. Such an arrangement decreases the possibility of issuing unnecessary or false alarms by hills when flying at a relative high altitude, when the chances of impacting the hill is negligible, and therefore increases the integrity of the alarm to the pilot when the alarm is issued.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
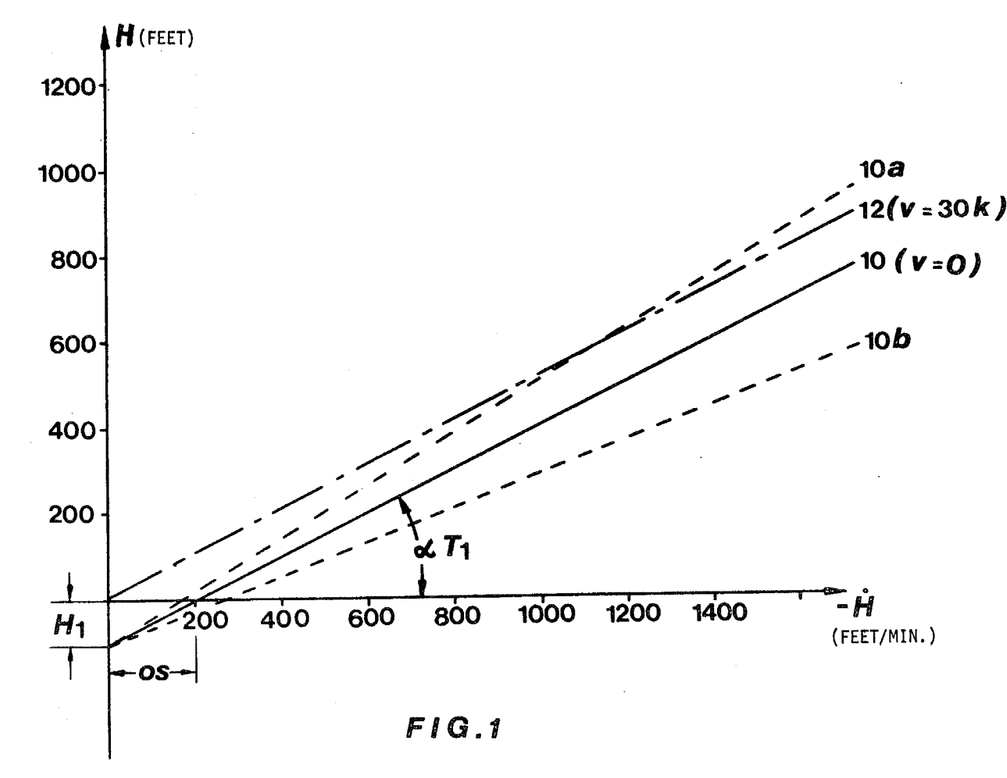
FIG. 1 is a graphic illustration of the relationship between aircraft altitude and maximum descent-rate which determines when the warning signal will be produced by the system described herein to indicate that the descent-rate is excessive for the respective altitude.

With reference first to the graph of FIG. 1, line 10 represents the relationship, at an aircraft forward-speed of "0" (V=0), between maximum descent-rate and altitude which determines when a warning signal is to be produced by the system described herein. It will be noted that line 10 is substantially linear and intersects the ordinate (0-altitude, i.e. touchdown point) at 200 feet per minute. The latter is the offset value "OS". This means that at an aircraft forward velocity of "0" knots, the maximum descent-rate of the helicopter should be 200 feet per minute at touchdown (offset distance "OS"). Before touchdown, the maximum descent-rate increases linearly with altitude, according to the slope of line 10, and any descent-rate for a particular altitude which is below line 10 (when V=0) will produce a warning signal.

If the helicopter forward velocity is greater than "0", the system described herein reduce the offset "OS", causing the line to move closer to the "0" descent-rate at touchdown. Line 12 illustrates this relationship at a helicopter forward velicity of 30 knots (V=30) wherein the offset "OS" is reduced to "0". This means that at a forward velocity of 30 knots, the maximum descent-rate is "0" at 0-altitude (touchdown); if it is above "0", the warning system will be actuated. Thus a warning signal will be produced as the aircraft approaches touchdown should it be travelling 30 knots or more.

It will thus be seen that the helicopter forward velocity modifies the linear relationship between maximum descent-rate and aircraft altitude by shifting the line (e.g. 10 or 12) representing this linear relationship, to reduce the offset "OS". This shifting is done in a linear manner for changes in forward velocities from 0 to 30 knots in the system described herein. In addition, the sensitivity of the variation of this offset "OS" with respect to aircraft forward speed can be preselected by the pilot according to varying flight conditions, as will be described more particularly below with respect to FIGS. 5 and 6 of the drawings.

Further, the slope of this line (e.g., 10 or 12) can be varied, according to the torque on the helicopter engine, namely the weight of the helicopter. Thus, the slope of line 10 may be increased to the position shown by broken line 10a for increased engine torques, and may be decreased to the position shown by broken line 10b for decreased engine torques. The manner in which this is accomplished will also be described more particularly below.

Figure 2:
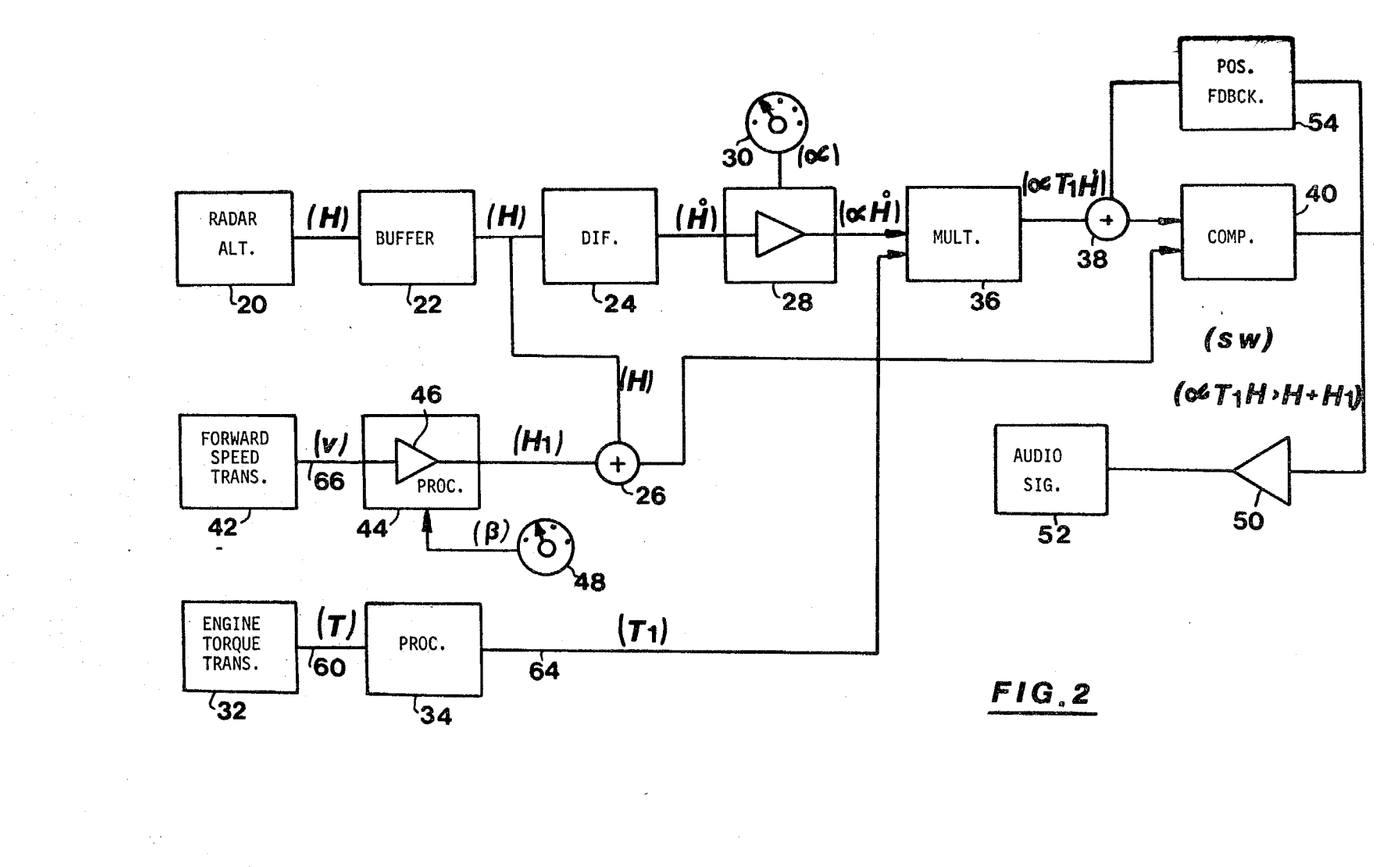
FIG. 2 is a functional block diagram of an excessive descent-rate warning system for use with helicopters constructed in accordance with the invention to produce a warning signal in accordance with the predetermined relationship illustrated in FIG. 1.

FIG. 2 is a block diagram of a system operating according to the characteristics illustrated in FIG. 1. This system includes an altitude measuring device 20, preferably a radar altimeter, which produces an electrical signal (H) representative of the altitude. This signal is fed to a buffer 22 which imputs it to a differentiator 24 and also to a summation network 26.

Differentiator 24 differentiates the altitude signal (H) and produces a rate-of-change altitude signal (H), which is fed which is fed to an amplifier 28. The latter amplifier has a variable gain ($\alpha$) which can be preset by the pilot by means of a sensitivity selector 30. The output ($\alpha$H) of the variable-gain amplifier 28 is then applied to one input of a multiplier 36 for multiplication by a factor $T_1$ corresponding to engine torque.

Figure 3:
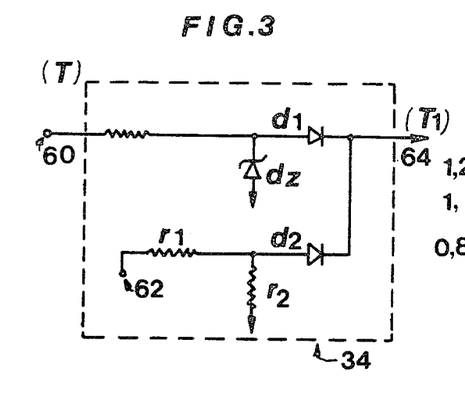
FIG. 3 is a circuit illustrating an engine-torque processor which may be used in the system of FIG. 2.

The engine-torque factor $T_1$ is generated by an engine-torque transducer 32 which produces an engine-torque signal T. Transducer 32 is preferably a strain gauge applied to the helicopter rotor, so that its output signal (T) corresponds to the engine torque, namely the helicopter weight, at any particular instant. The engine-torque signal T is fed to a processor 34. This processor is illustrated in FIG. 3, and has the input-output characteristics illustrated in FIG. 4, both to be described more particularly below.

The signal $\alpha$H, corresponding to the descent-rate from differentiator 24 after amplification by the variable-gain amplifier 28, is fed into one input terminal of multiplier 36. The other input terminal of multiplier 36 receives the torque-factor signal ($T_1$) corresponding to the measured engine torque (T) after processing by processor 34. The output of multiplier 36 is thus the product of these two signals, namely $\alpha T_1 H$. This output is applied via summation network 38 to one input of a comparator 40.

The other input of comparator 40 receives the measured-altitude signal (H) as modified by a factor corresponding to the forward speed of the helicopter.

The latter signal is generated by a forward-speed transducer 42 which produces an electrical signal (V) corresponding to the measured speed. This signal is processed in a processor 44 which is more particularly illustrated in FIG. 5 and which has input-output characteristics illustrated in FIG. 6. Processor 44 includes an amplifier 46 which amplifies the forward-speed signal V from transducer 42, the gain ($\alpha$) of amplifier 46 being presettable by the pilot by means of a selector switch 48.

The output from processor 44 is an electrical signal ($H_1$) corresponding to the processed forward-speed signal (V) from transducer 42, and is applied to the summation point 26 where it is added with the altitude signal (H), to produce an output which is the sum of the two, namely $H+H_1$. The latter output is applied to comparator 40 where it is compared with the processed and engine-torque modified descent-rate signal ($\alpha T_1 H$) from multiplier 36.

Comparator 40 compares its two inputs, namely the torque-modified descent-rate signal ($\alpha T_1 H$) with the forward-speed-modified altitude signal ($H+H_1$) from summation point 26, so that if the former is greater than the latter ($\alpha T_1 H > H + H_1$), a warning signal SW is outputted to an amplifier 50 which actuates a signalling device 52. The latter may provide an audible signal to the pilot to indicate to him that the descent-rate at that instance is excessive for the particular altitude of the helicopter, whereupon the pilot should decrease the descent-rate until the warning signal terminates. In order to avoid "hunting" about the actuating point, a positive feedback circuit 54 is provided between the output of comparator and summation network 38 to increase the system hysteresis.

It will thus be seen that the gain ($\alpha$) of amplifier 28 multiplied (in multiplier 36) by the torque factor ($T_1$) from the engine-torque transducer 32 determines the slope of the warning line in FIG. 1 (e.g., line 10 for V=0, or line 12 for V=30), which line determines the maximum descent-rate for any particular altitude. The sensitivity selector 30 enables the pilot to preset the gain ($\alpha$) of amplifier 28, and thereby the slope of this line. As noted above, the slope of this line is also affected by the engine torque, so that at higher engine torques the slope will be increased (as indicated by broken-line 10a in FIG. 1), and at lower engine torques, the slope will be decreased (as indicated by broken-line 10b). Thus, a higher engine torque (meaning a larger aircraft weight) increases the altitude at which a given descent-rate will produce the warning signal, which thereby provides the pilot with an earlier warning so as to enable him to overcome the higher inertia of the helicopter to correct the descent-rate, if that should be necessary.

Figure 4:
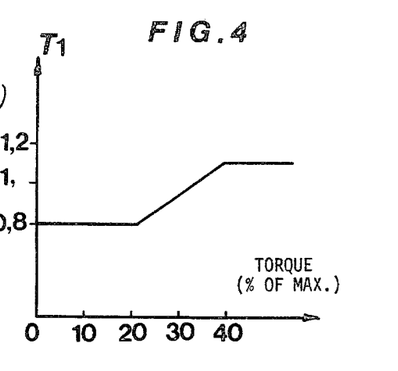
FIG. 4 is a graph illustrating the operation of the processor of FIG. 3.

As noted above, it would not be desirable to have the torque influence the slope of the warning line (10 or 12 in FIG. 1) in a linear manner for all torques, since during cruising conditions, when the torque is high, this would make the system too sensitive such as to tend to produce false alarms whereas during auto-rotation descent conditions, wherein the engine torque is low or substantially zero, this would make the system substantially insensitive to the descent-rate which could result in a crash. Accordingly, the engine-torque signal T from transducer 32 is limited in processor 34 so as to be effective only in a limited range, this being the range of 20%–40% of the maximum engine torque as shown in FIG. 4. Within this range, the influence of the engine torque on the slope of the warning line (10, 12 in FIG. 1) is substantially linear, as shown in FIG. 4, wherein it will be seen that at 20% engine torque (v) the torque-factor ($T_1$) is 0.8, at 30% engine torque it is 1.0, and at 40% engine torque it is 1.2. Outside of this range of 20%–40%, the engine torque has no influence on the slope of the warning line.

FIG. 3 illustrates a limiter circuit which may be used in the processor 34 to provide the input-output characteristics illustrated in FIG. 4. Thus, the torque signal (T) from transducer 32 is applied to line 60 which is by-passed to ground by a Zener diode $d_z$, which determines the upper limit of the output characteristic illustrated in FIG. 4. The lower limit is determined by resistors $r_1$, $r_2$ in a second line 62 which receives a positive voltage bias. The two lines are coupled via diodes $d_1$, $d_2$ to a common output line 64 which feeds the so-limited engine-torque signal, constituting the torque-factor $T_1$, to the multiplier 36 in FIG. 2.

Processor 44 in FIG. 2 limits the influence of the forward-speed signal (V) from transducer 42, so that this signal reduces the offset "OS" (FIG. 1) in a substantially linear manner for increasing forward speeds up to 30 knots, at which time the offset is "0"; above 30 knots, the offset remains at "0". A circuit which may be used as the processor 44 in FIG. 2 is illustrated in FIG. 5, and its input-output characteristics are shown in FIG. 6.

Figure 5:
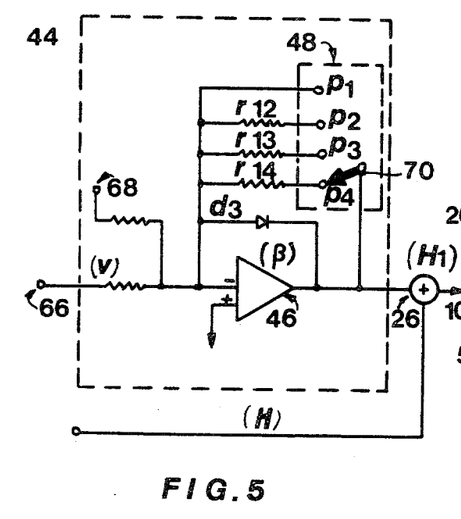
FIG. 5 is a circuit illustrating a forward-speed processor which may be used in the system of FIG. 2.

As shown in FIG. 5, processor 44 includes amplifier 46 receiving the forward-speed signal V from transducer 42. Amplifier 46 is biased by a negative voltage applied via line 68, there being a diode $d_3$ between the input and output of the amplifier. The gain ($\beta$) of amplifier 46 is determined by selector switch 48 which has a movable contact 70 presettable by the pilot to any one of four positions ($p_1$–$p_4$). Position $p_1$ shunts-out amplifier 46, and the other positions ($p_2$–$p_4$) introduce a resistance of a selected value (resistors $r_{12}$, $r_{13}$, $r_{14}$) in the shunt circuit. Thus, if selector contact 70 is placed: (1) in position $p_1$, amplifier 46 is completely shunted, so that the output signal $H_1$ will be "0" for all values of input signal V, as shown by line $p_1$ in FIG. 6; (2) in position $p_2$, a low value resistor $r_{12}$ is inserted into the shunt circuit, whereupon the relationship of the output $H_1$ to the input V will be as shown by line $p_2$ in FIG. 6; (3) in position $p_3$, a higher value resistor $r_{13}$ is inserted, whereupon this relationship will be as shown by line $p_3$ in FIG. 6; and (4) in position $p_4$, a still higher value resistor $r_{14}$ is inserted whereupon this relationship will be as shown by line $p_4$ in FIG. 6. FIG. 6 also relates the value "OS" in FIG. 1 (which defines the maximum descent-rate in feet/min. at touchdown) to the value $H_1$.

Figure 6:
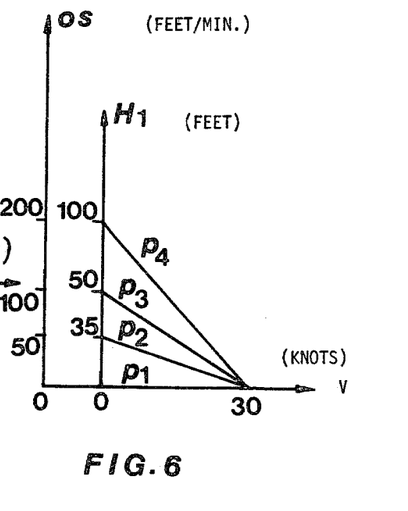
FIG. 6 is a graph illustrating the operation of the processor of FIG. 5.

It will thus be seen from FIG. 6 that when the measured forward speed (V) is 30 knots, both the offset signal $H_1$ and the offset value OS are "0" for all positions of selector contact 70, which means that, at this speed, the maximum descent-rate at touchdown should be substantially "0". Both values $H_1$ and OS increase with decreasing forward speeds (except when selector contact 70 is in position $p_1$ where both values remain at ("0"), the rate of increase being the highest at position, $p_4$. At $p_4$, the value $H_1$ at "0" forward speed is approximately 100 ft., and the offset OS is approximately 200 ft/minute, which is the maximum descent-rate, and is at the most ideal conditions of the setting of selector 48 and of the measured forward speed.

The example illustrated in FIG. 6 applies when the slope of the warning line (10 or 12) is as illustrated in FIG. 1, this slope being variable in response to the measured engine torque (e.g., lines 10a, 10b) as described above.

It will thus be seen that the illustrated helicopter excessive descent-rate system provides automatic control for actuation of the warning signal in response to forward speed and engine torque, and also enables manual control for presetting the sensitivities of the automatic controls according to the specific flying conditions prevalent at the time of the flight. Thus, the sensitivity of the automatic control provided by the descent-rate signal (H) can be manually preselected by the pilot via selector 30 which changes the gain ($\alpha$) of amplifier 28; and the sensitivity of the automatic control responsive to the forward-speed signal (V) can be manually preselected by the pilot via selector 48 by changing the gain ($\beta$) of amplifier 46.

For purposes of example, the selectors 30 and 48 can change the gains ($\alpha$ and $\beta$, respectively) as follows:

| $\alpha$-variations by selector 30 | $\beta$-variations by selector 48 |
|---|---|
| $\alpha_1$ = 0.30 secs. | $\beta_1$ = 0    feet/knot |
| $\alpha_2$ = 0.40 secs. | $\beta_2$ = 1.7 feet/knot |
| $\alpha_3$ = 0.50 secs. | $\beta_3$ = 3.3 feet/knot |
| $\alpha_4$ = 0.65 secs. | $\beta_4$ = 6.7 feet/knot |
| $\alpha_5$ = 0.80 secs. | |
| $\alpha_6$ = 1.00 secs. | |

Figures 7, 8A, 8B:
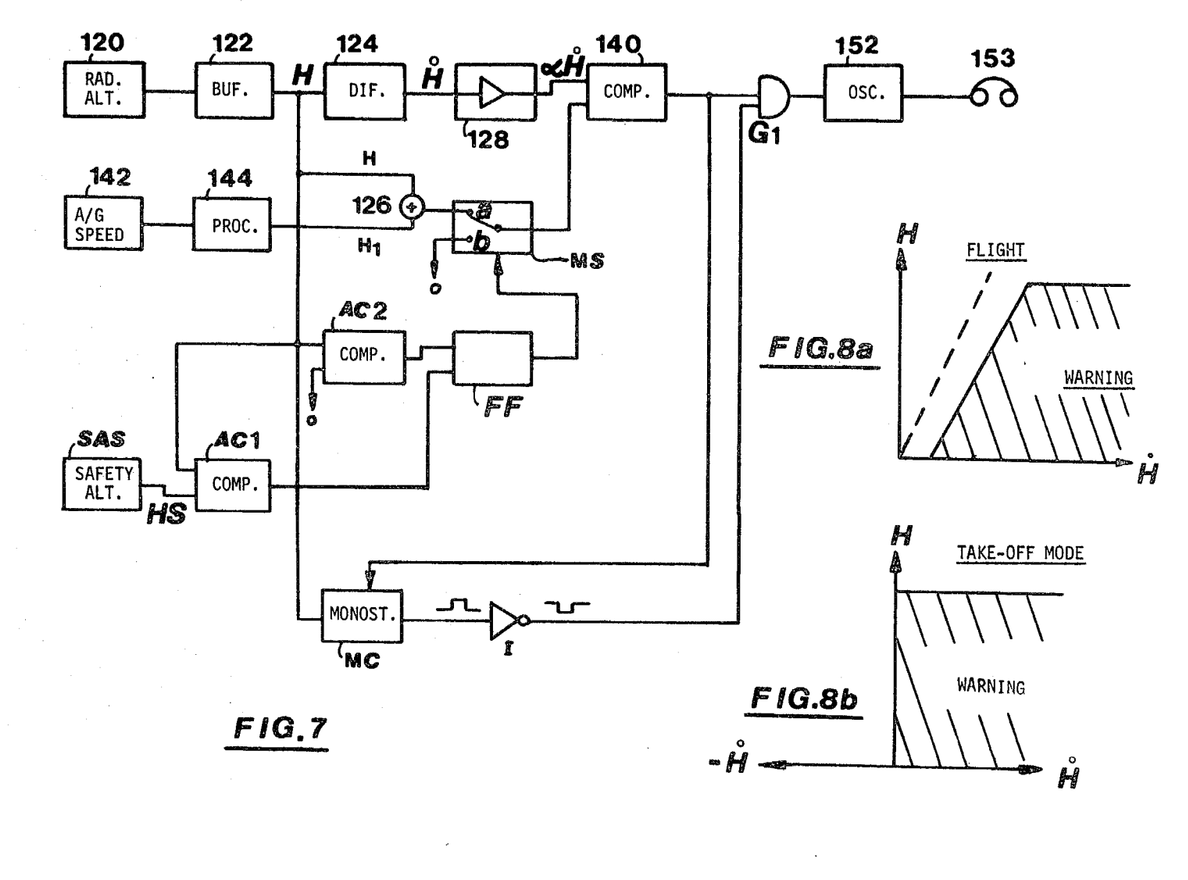
FIG. 7 is a functional block diagram of an excessive descent-rate warning system similar to that of FIG. 2 but modified to include other features of the present invention.
FIGS. 8a and 8b are graphs illustrating the Flight Mode operation and the Take-off Mode operation, respectively, of the system of FIG. 7.

The circuit illustrated in the block diagram of FIG. 7 is similar to that described above except that it has been modified to include a number of elements to incorporate further optional features. It also omits other elements for simplifying the present description. More particularly, the block diagram of FIG. 7 omits the elements which introduce the engine-torque factor influencing the altitude at which a given descent-rate will produce the warning signal, namely the engine-torque transducer (32), the engine-torque processor (34), and the multiplier (36) receiving the signal from the latter processor.

The elements added in the modified circuit illustrated in FIG. 7 include an automatic mode selector MS, a flip-flop FF controlling same, a monostable circuit C, a safety-altitude selector SAS, and two comparators AC1 and AC2. Briefly, the automatic mode selector MS, the flip-flop FF, the safety-altitude selector SAS, and the two comparators AC1, AC2, are in the portion of the newly-added circuit which automatically actuates the system to either a Flight Mode or to a Take-off Mode, the system being effective in the latter mode to cause a warning signal to be produced by any descent of the helicopter until it reaches a predetermined safe altitude. The newly-added monostable circuit MC controls a gate G1 which suppresses the warning signal for a period of time which increases with an increase in the altitude of the helicopter in order to minimize false alarms.

More particularly, the circuit illustrated in the block diagram of FIG. 7 includes a radar altimeter 120 which produces an electrical signal (H) representatived of altitude, a buffer (122), and a differentiator 124 which differentiates the altitude signal (H) and produces a rate-of-change of altitude signal (H) which is fed to an amplifier 128 having a preset-table variable gain ($\alpha$). The foregoing elements 120, 122, 124 and 128 correspond, respectively to elements 20, 22, 24 and 28 of FIG. 2.

As further described with reference to FIG. 2 above, the altitude signal H is fed to a summation network 126, which network also receives a speed offset signal $H_1$ from a forward speed processor 144 corresponding to the processed forward-speed signal (V) from a forward speed transducer 142. However, instead of having the summation network 126 apply the output signal $(H+H_1)$ directly to comparator circuit 140 as in the system of FIGS. 1-6, the output signal from network 126 is applied to one input terminal (a) of the mode selector switch MS, the output of which switch is connected to the comparator circuit 140. Mode selector switch MS has another input terminal (b) connected to a "0" voltage level, so that the comparator 140 will receive either the signal $(H+H_1)$ from network 126 (terminal "a"), or the "0" level signal (terminal "b"), depending upon the condition of the mode selector switch MS. Terminal "a" respresents the Flight Mode, and terminal "b" represents the Take-off Mode.

The mode selector switch MS is normally in the Take-off Mode, (wherein its input terminal "B" is connected to the comparator 140), but is automatically actuated to the Flight Mode (wherein its input terminal "a" is connected to comparator 140) when the helicopter reaches a safe predetermined altitude. For this purpose, the circuit includes altitude comparator AC1 having one input terminal connected to the safety altitude selector SAS which may be preset by the pilot to input a predetermined safety altitude signal Hs. The other input terminal of altitude comparator AC1 receives the measured altitude H from the radar altimeter 120. The output of comparator AC1 is applied to the "reset" terminal of flip-flop FF.

The "set" terminal of flip-flop FF is connected to the output terminal of the second comparator AC2. This comparator has a first input of the altitude signal H, and a second input of "0".

The arrangement is such that on take-off, flip-flop FF is in the "set" condition and the mode selector switch MS is in the Take-off Mode wherein its "b" terminal is connected to comparator 140. When in this condition, comparator 140 will produce a warning signal to the pilot, via oscillator 152 and the pilot's headset 153, upon any descent of the helicopter. As soon as the helicopter reaches the predetermined safe altitude, as selected by the safety altitude selector SAS, comparator AC1 resets flip-flop FF which actuates the mode selector switch MS to its "a" terminal, thereby connecting summation point 126 to comparator 140. This is the Flight-Mode, wherein comparator 140 will output a warning signal only if the descent rate becomes excessive, taking into consideration the forward speed of the helicopter as inputted via transducer 142. The excessive descent-rate warning system thus becomes enabled for the remainder of the flight of the helicopter. Upon landing of the helicopter, the altitude signal H becomes "0", whereupon comparator AC2 sets flip-flop FF, causing same to actuate the mode selector switch MS to its "b" position, (i.e. to its Flight Mode) preparatory to the next take-off.

The monostable circuit MC, as indicated above, is provided to suppress the warning signal for a period of time according to the altitude of the helicopter. This circuit MC receives the altitude signal (H) from the altimeter 120 via the buffer circuit 122, and after being triggered by the warning signal from comparator 140, it produces an output pulse having a duration corresponding to the measured altitude. That is to say, the higher the altitude, the longer will be the duration of the output signal produced by the monostable circuit MC after being triggered by the warning signal from comparator 140. The output of the monostable circuit MC is inverted by an inverter I and is applied to one input-terminal of AND-gate G1, the gate having a second input terminal connected to the output of comparator 140. The output of gate G1 is connected to audio oscillator 152 which produces the audio signal to the pilot via the headset 153.

The monostable circuit MC thus suppresses the audio signal outputted to the pilot for a period of time corresponding to the measured altitude H. Accordingly, when the helicopter is at a low altitude, the warning signal will be suppressed for a very short period of time, but when the helicopter is at a high altitude wherein sudden descents are not as dangerous, the warning signal will be suppressed for a longer period of time, thereby minimizing the outputting of unnecesary or false alarms.

The operation of the system will now be more particularly described, particularly with reference to FIGS. 8a and 8b. FIG. 8a illustrates the Flight Mode operation as described above wherein a warning signal is issued upon sensing an excessive descent-rate, taking into consideration the altitude of the helicopter and also its forward speed. FIG. 8b illustrates the Take-off Mode operation wherein the warning signal is produced upon any descent of the helicopter during take-off until it reaches a predetermined safe altitude as present by the safety altitude selector SAS.

On take-off, flip-flop FF is in its "set" condition, and the mode selector switch MS is in its "b" position (i.e. its Take-off Mode position) connecting the "0" terminal to comparator 140. The other terminal of comparator 140 is connected to receive the descent rate signal H from the variable gain amplifier 128, namely the rate-of-change of altitude signal (H) modified according to the desired sensitivity as preselected by presetting the gain ($\alpha$) of amplifier 128.

Thus, during the Take-off Mode, any descent of the helicopter will cause the comparator 140 to issue an output warning signal. This warning signal is fed to gate G1, and also triggers the monostable circuit MC causing same to produce an output pulse having a duration corresponding to the actual altitude (H) of the helicopter. This altitude during take-off will be very small, and therefore the duration of the signal from the monostable circuit MC will be relatively short. This signal, after being inverted by inverter I, is applied to gate G1 to block the transmission of the warning signal from comparator 140 until the termination of the output signal from the monostable circuit MC. Since during take-off the duration of the monostable MC signal is very short, its blocking of the warning signal will also be very short, so that as a practical matter, the warning signal from comparator 140 is passed almost immediately via gate G1 to the audio oscillator 152. Thus, an alarm is sounded to the pilot, via his headset 153, upon the occurrence of any significant descent during the take-off, as shown in the diagram of FIG. 8b.

After the helicopter reaches the predetermined safety altitude, as preselected by the safety altitude selector SAS, comparator circuit AC1 resets flip-flop FF, causing it to actuate the mode selector switch MS to its Flight Mode, namely connecting its input terminal "a" to comparator 140. During the Flight Mode, the comparator 140 will output a warning signal to AND-gate G1 only when an excessive descent-rate has been sensed, taking to consideration the altitude of the helicopter and also its forwardspeed, as shown in FIG. 8a and as more particularly described above.

Thus, the altitude signal H from the altimeter 120, following the buffer 122, is differentiated in circuit 124 to produce a rate-of-change altitude signal (H), which is modified, according to a preselected sensitivity, by varying the gain (α) of amplifier 128 before being applied to one input terminal of comparator 140. The other input terminal of comparator 140 receives, from the summation network 126, the sum of the altitude signal (H), and the speed offset signal (H₁), the latter being derived from the ground speed transducer 142 after being modified by the forward speed processor 144 according to a desired sensitivity as preselected by the pilot.

Accordingly, when the system is in the Flight Mode, comparator 140 will output a warning signal whenever the descent-rate is excessive for the respective altitude and the other conditions of the helicopter, as described more particularly above.

However, this warning signal from comparator 140 is not immediately passed to the audio oscillator 152 for warning the pilot via his headset 153, but rather, as described above, is blocked by AND-gate G1 for a period of time corresponding to the altitude of the helicopter at that instant. Thus, the warning signal outputted by comparator 140 triggers monostable circuit MC, which circuit produces a pulse having a duration corresponding to the actual altitude H of the helicopter at that instant. The output of monostable circuit MC, after being inverted by inverter I, is applied to gate G1 together with the warning signal from comparator 140, so that the latter is passed via the gate to audio oscillator 152 only after termination of the output signal from the monostable circuit MC. As soon as this signal terminates, the warning signal 140, if still present, is passed to the audio oscillator 152 to produce an audio signal to the pilot via his headset 153.

As noted above, for simplifying the present description the circuit illustrated in FIG. 7 does not include the elements producing the engine-torque factor influencing the altitude at which a given descent rate will produce the warning signal as described above. This is an optional feature, and it will be appreciated that it could be included in the circuit of FIG. 7.

What is claimed is:

1. An excessive descent-rate warning system particularly useful for helicopter aircraft, characterized in that it includes means for measuring the aircraft altitude and for producing an altitude signal corresponding thereto; means for differentiating the altitude signal and for producing a descent-rate signal corresponding to the rate of change of the altitude signal; comparator means for comparing the altitude and descent-rate signals and for producing a warning signal whenever the descent-rate exceeds the maximum one for the respective altitude according to a predetermined relationship, which relationship includes an offset value defining the maximum descent-rate at "0" altitude; means for measuring the forward speed of the aircraft and for producing a forward-speed signal corresponding thereto; and forward-speed controlled means for causing an increase in said forward-speed signal to reduce said offset and thereby to decrease the maximum descent-rate at "0" altitude which produces said warning signal; said forward-speed controlled means including a sensitivity selector presettable by the pilot to permit him to preset the rate at which said latter means will reduce said offset.

2. A system according to claim 1, wherein said predetermined relationship is a substantially linear one represented by a substantially straight line in a graphic illustration of such relationship, and includes an offset value defining the maximum descent-rate at "0" altitude, said forward-speed controlled means shifting said substantially straight line in a direction to reduce said offset at increased forward speeds.

3. A system according to claim 1, wherein said forward-speed controlled means reduces said offset in a substantially linear manner with respect to forward speeds of up to about 30 knots, and reduces said offset to "0" at about 30 knots and above.

4. A system according to claim 1, wherein said forward-speed controlled means comprises an amplifier having an input receiving said forward-speed signal, said presettable sensitivity selector including a selector switch presettable by the pilot and effective to control the gain of said amplifier.

5. A system according to claim 1, further including means for measuring helicopter engine torque and for producing an engine-torque signal corresponding thereto; and means for utilizing said engine-torque signal for modifying said predetermined relationship such that an increase in torque increases the altitude at which a given descent rate will produce the warning signal.

6. A system according to claim 5, wherein said predetermined relationship is substantially a linear one represented by a substantially straight line in a graphic illustration thereof, said engine-torque signal being effective to change the slope of said substantially straight line such that the slope is increased with increased engine torques and decreased with decreased engine torques.

7. A system according to claim 6, further including limiter means limiting the effectiveness of the torque signal to modify said predetermined relationship to a range of approximately 20%–40% of maximum engine-torque.

8. A system according to claim 1, further including control means effective upon take-off to cause a warning signal to be produced upon any descent of the aircraft until it reaches a preselected altitude.

9. A system according to preceding claim 8, wherein said latter control means comprises a mode selector switch automatically actuatable to either a Flight Mode or to a Take-off Mode, comparator means comparing the measured aircraft altitude with said preselected altitude, said comparing means maintaining the mode selector switch in the Take-Off Mode while the measured altitude is less than the preselected altitude, and automatically actuating the mode selector switch to the Flight Mode when the measured altitude reaches the preselected altitude; and a control circuit controlled by said mode selector switch to cause a warning signal to be produced upon any descent of the aircraft when the mode selector switch is in the Take-off Mode.

10. A system according to claim 1, further including suppressing means for suppressing the warning signal for a period of time which increases with an increase in the altitude signal corresponding to the measured aircraft altitude.

11. A system according to claim 10, wherein said suppressing means comprises a monostable circuit receiving said altitude signal and producing an output signal having a duration increasing with an increase in the measured altitude; and means for suppressing the warning signal for a period of time according to the duration of the output signal from the monostable circuit.

* * * * *